United States Patent Office 3,204,097
Patented Aug. 31, 1965

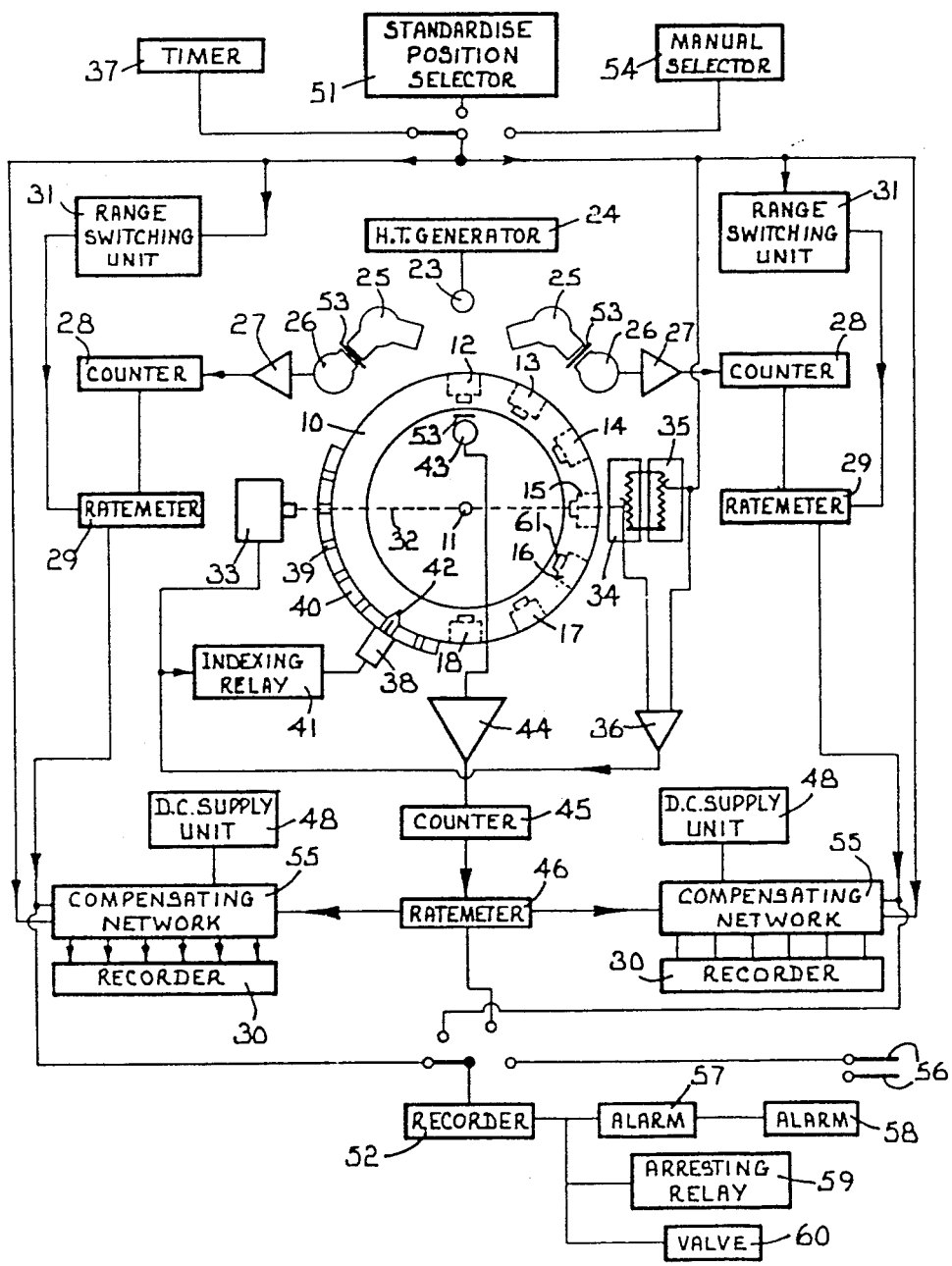

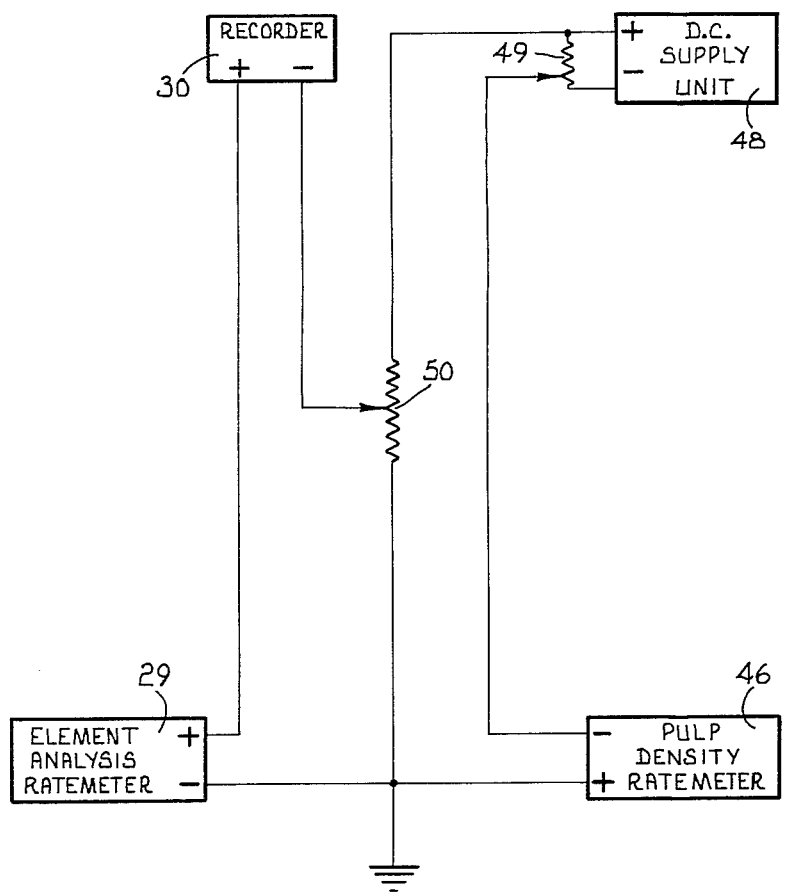

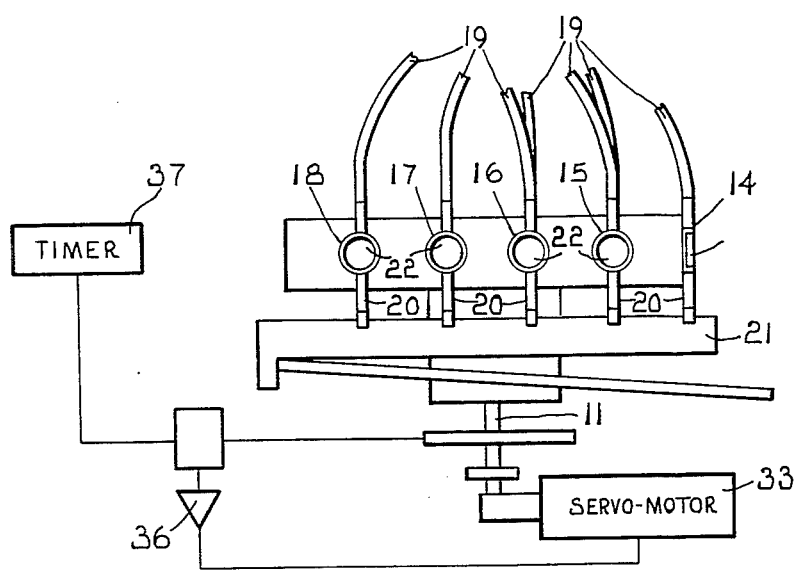

3,204,097
METHOD OF X-RAY SPECTOGRAPHIC ANALYSIS OF A MIXTURE OF SOLID PARTICLES AND LIQUID
Walter G. Moffat and Robert Carson, Kitwe, Northern Rhodesia, assignors to Rhoanglo Mine Services Limited, Salisbury, Southern Rhodesia
Filed Oct. 4, 1962, Ser. No. 228,318
Claims priority, application Rhodesia and Nyasaland, Oct. 11, 1961, 492/61
1 Claim. (Cl. 250—51.5)

This invention relates to the X-ray spectrographic analysis of elements contained in a pulp or slurry.

The secondary emission from a pulp sample, when irradiated with X-rays, provides a quantitative measure of the elemental concentration within the sample. The intensity of the secondary emission is, however, dependent on the density of the pulp in the sample. Therefore, if the intensity of the secondary emission is to be directly indicative of the metal content of the pulp it is necessary either to maintain a constant pulp density or to make corrections for the variations in the pulp density. It would not usually be economical to maintain a constant pulp density.

It is an object of the present invention to provide a method and apparatus by means of which the measure of the elemental concentration within the sample is automatically corrected for variations in the density of the pulp.

A method according to the invention of analysing, by X-ray spectrographic techniques, elements contained in a fluent sample, includes the steps of irradiating the sample with X-rays, detecting the secondary emission from the sample to provide a quantitative measure of the elemental concentration in the sample, detecting the rays when they have passed through the sample and have been attenuated by it, employing the degree of attenuation of the rays to adjust the quantitative measure for variation in the density of the sample from a prescribed norm and measuring the adjusted quantitative measure.

Apparatus according to the invention comprises a source of X-rays to irradiate the sample, means to detect the secondary emission from the sample to provide a quantitative measure of the elemental concentration in the sample, means to detect the rays when they have passed through the sample and have been attenuated by it, means to employ the degree of attenuation of the rays to adjust the quantitative measure for variation of the density of the sample from a prescribed norm and means to measure the adjusted quantitative measure.

To illustrate the invention an embodiment thereof is described hereunder with reference to the accompanying drawings in which FIGURE 1 shows a block schematic analysing diagram of a pulp machine according to the invention;

FIGURE 2 shows the basic circuit diagram for pulp density compensation; and

FIGURE 3 shows a block schematic diagram of the turntable carrying the presentation cells and its associated components.

With reference to FIGURES 1 and 3 a turntable 10 is mounted for rotation about the vertical axis 11. Six sample presentation cells 12, 13, 14, 15, 16 and 17 are located around part of the periphery of the turntable 10. A seventh cell 18, containing a permanent standard sample is also provided on the turntable 10. The purpose of the standardizing cell 18 will become apparent as the specification progresses.

Representative samples of pulps are caused to flow continuously through the cells 12 to 17. The pulps enter the cells through flexible pipes 19 of a suitable material and are discharged through pipes 20 into a circular launder 21 which conducts the pulps out of the machine. The cells 12 to 18 are provided with windows 22 to permit X-ray irradiation of their contents. The design of the cells is essentially of such a nature as to promote turbulence inside the cell.

An X-ray tube 23 energized by a high tension generator 24 is located to irradiate the contents of a cell offered to it (cell number 12 in FIGURE 1).

Two analysers 25 are mounted on either side of the X-ray tube 23. The reason for using two analysers is that two elements in the pulp sample may be analysed simultaneously. A greater number of analysers may of course, be used within the available space. The analysers are similar and are connected to recorders, each in the same way as the other. For purposes of explanation therefore only one analyser and its associated circuits will be described.

Analyser 25 consists of entrance and exit collimators or slits and analysing crystals. The primary X-ray beam falls on to the sample and excites the atoms of the various elements in the sample in accordance with Moseley's law. The excited atoms, in turn, emit secondary X-rays the wavelengths of which are characteristic of their particular element. The secondary X-rays are dispersed by the crystal of the analyser 25 which allows only the required characteristic wavelengths to be diffracted on to a scintillation detector 26.

The signal derived from the scintillation detector 26 consists of a series of electrical impulses, the repetition rate of which is quantitatively related to the intensity of the incident X-rays. These electrical impulses are fed to an amplifier 27 which amplifies the impulses to the required level. The output of the amplifier 27 is fed to a counter 28 which counts the pulses. A ratemeter 29 converts the impulse signals from the counter 28 to a D.C. signal which is then applied to one of the recorders 30. A range switching unit 31 is provided, so that a wide variety of element concentrations may be measured.

The turntable 10 is driven, through a coupling 32, from a servo motor 33 which, together with a slide wire 34 operated by the servo motor 33, a potential divider 35 and a servo amplifier 36, forms a self-balancing servo system.

A timing mechanism 37 actuates a series of relays (not shown) at predetermined intervals. Just prior to the actuation of the relays the servo system mentioned above is in a state of balance. In other words the signal from the slide wire 34 and that from the potential divider 35 are equal and opposite and the servo motor 33 is therefore not energized. When the timer 37 actuates the relays the arm of the potential divider 35 is moved a predetermined distance thus causing a state of unbalance between the potential divider and the slide wire 34. The voltage due to the unbalance is amplified by the amplifier 36 and applied to the servo motor 33. The servo motor is energized causing the turntable 10 to be rotated through the coupling 32 and also causes the arm of the slide wire 34 to be moved until a state of balance is restored. The turntable is so arranged that at this new point of balance the second cell 13 is in a position to be irradiated.

The accuracy of the positioning of the cells is further ensured by the provision of an indexing solenoid 38, whose plunger engages in holes 39 drilled in an indexing strip 40. When the timer 37 initiates a change in turntable position the unbalance from the slide wire and the potential divider results in a large output voltage from the amplifier 36. This voltage is rectified and applied to an indexing relay 41 which operates and completes the supply to the indexing solenoid 38. The solenoid 38 operates and its plunger 42 disengages from the indexing strip 40 so permitting the turntable 10 to rotate towards its new position. As the servo-mechanism approaches its new state of balance the output voltage from the amplifier 36 falls, releasing the indexing relay 41 and de-energizing the solenoid 38 the plunger 42 of which moves under the compulsion of a spring (not shown) to engage in the appropriate hole in the indexing strip 40.

The relays of the timing circuit 37 do not only actuate the arm of the potentiometer 35 but also set the ratemeter 29 to the appropriate range by means of range switching unit 31, select the appropriate pulp density compensation circuit (to be described further on) and select the appropriate recorder (since there are 6 recorders corresponding to the 6 presentation cells).

When all six pulp streams have been presented for analysis sequentially the turntable reverses, moves back to its original position (cell number 12) and the whole sequence is repeated automatically.

The density of the pulps flowing through the presentation cells 12 to 17 may vary and, since this pulp density may have a considerable influence on the intensity measured by the scintillation detectors 26 means is provided for compensating the measured intensity for changes in the pulp density.

In other words it is highly desirable that the instantaneous intensity measured at a specific pulp density be converted to the intensity which would be measured if the pulp density were in fact the normal or "mean" for the plant. The normal pulp density for the plant is, of course known.

The principle employed in compensating for variations in pulp density is that if the pulp density fall below the mean value (the plant "norm") the intensity measurement derived from the scintillation detector 26 is automatically increased whereas if the pulp density increases above the plant "norm" the intensity measurement is automatically decreased.

With reference to FIGURE 1 a third scintillation detector 43 is positioned to receive that residuum of the primary X-ray beam which passes through the presentation cell offered for analysis. The intensity of the radiation falling on the scintillation detector 43 is an inverse function of the density of the pulp passing through the presentation cell being irradiated.

The output of detector 43 is applied to an amplifier 44, a counter 45, a ratemeter 46 and thereafter to the pulp density compensating network about to be described with reference to FIGURE 2.

A constant voltage D.C. supply unit 48 has a potentiometer 49 connected across its output terminals. An adjustable fraction of the voltage across potentiometer 49 is connected in series opposition with the output from the pulp density ratemeter 46. If the voltage taken off from potentiometer 49 differs from the output voltage of ratemeter 46 this difference voltage will appear across potentiometer 50. Potentiometer 49, is so adjusted that the output voltage from ratemeter 46 is exactly cancelled when the density of the pulp is of the value judged to be the "norm" for that pulp. For any other pulp density a fraction of the voltage appearing across potentiometer 50 is connected to a recorder 30 in series with the output from the element analysis ratemeter 29 so as to apply an additive correction for a reduced pulp density. The potentiometers 49 and 50 are housed in a unit designated 55 in FIGURE 1.

Since in this embodiment there are six pulp streams and two elements are analysed in each stream, twelve potentiometers 50 and twelve potentiometers 49 are required. These are selected in two groups, of six pairs each, by means of the relays operated by the timer 37 and each selection is accompanied by the selection of the appropriate pair of recorders.

An important feature of the system is the incorporation of suitable filters 61 between the pulp density detector 43 and the cell presented for irradiation in order to provide a linear relationship between the intensity of the attenuated X-rays and the density of the pulp. The nature and the thickness of the filters 61 are dependent on the voltage applied to the X-ray tube, the metal used for the X-ray target and the nature of the irradiated pulp.

Cell number 18 contains a standard sample of material. The stability of the instruments can be checked by use of the standardize position selector 51. This causes the turntable to rotate automatically until the standard cell 18 is positioned for irradiation. Recorder 52 can now be switched in to read the output voltage of one or the other of the element analysis ratemeters 29 or of the pulp density ratemeter 46. Since the characteristics of the standard sample are known these readings will reveal any drift which may have taken place in the various components. Drift due to small changes in the scintillation detector characteristics or due to ageing of electrical components may be compensated for by adjustment of irises 53 between the analysers 25 and the scintillation detectors 26 and preceding the detector 43. Large changes in the standardization readings would indicate fault conditions.

It is possible to switch out the timer 37 and rotate the turntable by switching to the manual selector 54. This facility is necessary to enable individual calibration to be carried out on the various pulp streams.

It is important to guard against damage to the apparatus which might otherwise result from leakage of the pulp such as would result from a ruptured window on a presentation cell. There are various ways in which this might be achieved. In the embodiment illustrated it is accomplished by the use of spaced electrodes 56 which are located to be bridged by escaped pulp which, being electrically conductive, completes a circuit to recorder 52. This operates a visual alarm 57, an audible alarm 58, a servo-mechanism arresting relay 59 and an electromagnetic system of valves 60 for cutting off the supply of pulps to the presentation cells.

We claim:

A method of analyzing, by X-ray spectrographic techniques, the concentration of a given element in the solid particles of a mixture of solid particles and liquid, comprising the steps of irradiating with X-rays a sample of a mixture of solid particles and liquid in which the solid particles contain a plurality of different elements and in which the solid particles have a greater degree of radiopacity than the liquid, detecting the secondary emission from the sample to provide a first signal whose value varies as the concentration of said given element in the mixture as a whole, detecting rays that have passed through the sample to provide a second signal whose value varies at the concentration of solid particles in the liquid, employing said second signal to correct said first signal for departures of the concentration of solid particles in the liquid from a reference concentration, and displaying the thus-corrected first signal in terms of the concentration of said given element in said solid particles.

References Cited by the Examiner
UNITED STATES PATENTS

| | | | |
|---|---|---|---|
| 2,612,608 | 9/52 | Miller | 250—43.5 |
| 2,791,698 | 5/57 | Dyroff et al. | 250—51.5 |
| 2,897,371 | 7/59 | Hasler | 250—51.5 |
| 2,977,478 | 3/61 | Wuppermann | 250—51.5 |
| 2,999,937 | 9/61 | Kohler | 250—43.5 |
| 3,031,571 | 4/62 | Fearon | 250—51.5 |
| 3,046,399 | 7/62 | Ladell | 250—51.5 |

RALPH G. NILSON, *Primary Examiner.*